US011860890B2

(12) United States Patent
Rafee

(10) Patent No.: US 11,860,890 B2
(45) Date of Patent: Jan. 2, 2024

(54) SYSTEM AND METHOD FOR SYNCHRONIZING AND RECONCILING DATA FROM EDGE NODE TO CLOUD NODE

(71) Applicant: Nife Labs Pte Ltd, Singapore (SG)

(72) Inventor: Nida Sahar Rafee, Bangalore (IN)

(73) Assignee: NIFE LABS PTE LTD, Singapore (SG)

( * ) Notice: Subject to any disclaimer, the term of this patent is extended or adjusted under 35 U.S.C. 154(b) by 0 days.

(21) Appl. No.: 17/486,698

(22) Filed: Sep. 27, 2021

(65) Prior Publication Data

US 2023/0095514 A1    Mar. 30, 2023

(51) Int. Cl.
*G06F 16/30* (2019.01)
*G06F 16/27* (2019.01)
*G06F 16/2455* (2019.01)
*G06F 16/28* (2019.01)

(52) U.S. Cl.
CPC ........ *G06F 16/27* (2019.01); *G06F 16/24568* (2019.01); *G06F 16/285* (2019.01)

(58) Field of Classification Search
CPC ... G06F 16/27; G06F 16/24568; G06F 16/285
See application file for complete search history.

(56) References Cited

U.S. PATENT DOCUMENTS

| | | | |
|---|---|---|---|
| 2018/0139309 A1* | 5/2018 | Pasam | H04L 69/08 |
| 2018/0192330 A1* | 7/2018 | Yamasaki | H04W 36/0016 |
| 2021/0021361 A1* | 1/2021 | Allsbrook | H04J 3/0638 |
| 2022/0173886 A1* | 6/2022 | Sardesai | H04L 63/0428 |

* cited by examiner

*Primary Examiner* — Khanh B Pham

(57) ABSTRACT

A processor-implemented method for synchronizing and reconciling data stream in real-time between an edge node and a cloud node is provided. The method includes (i) generating classified data by classifying data of the data stream that is obtained from a plurality of edge nodes in real-time to synchronize in a location at a plurality of cloud nodes, (ii) synchronizing the classified data in the plurality of cloud nodes by detecting a first location and a type of database in the plurality of cloud nodes and storing the classified data in the first location in the plurality of cloud, (iii) replicating the classified data in a plurality of second locations in the plurality of cloud nodes, and (iv) receiving, from the plurality of edge nodes, a request signal for synchronizing the classified data from the plurality of cloud nodes to the plurality of edge nodes when the first location in the plurality of cloud nodes fails to transfer the classified data during a transaction.

7 Claims, 6 Drawing Sheets

SYSTEM AND METHOD FOR SYNCHRONIZING AND RECONCILING DATA FROM EDGE NODE TO CLOUD NODE

BACKGROUND

Technical Field

The present disclosure relates to the field of synchronizing and reconciling data streams, and more particularly, to a system and method for synchronizing and reconciling data streams in real-time between an edge node and a cloud node without duplicating the data based on the synchronization table.

Description of the Related Art

In cloud computing systems, computing and storage services are provided to remote clients over a wide area network such as the Internet. In the case of storage, a client's local files can be stored on the cloud and accessed by the client remotely.

Often a client's file system will exist both in the client's local storage device (e.g., a hard drive, network-attached storage (NAS) device, etc.) and in the cloud. For example, a client might store a backup copy of its local file system in the cloud. Doing so is beneficial from the standpoint that the client has a backup copy of its file system. However, any benefit of the backup is negated as more and more changes are made to the local file system. Thus, it becomes a burden on the client to make sure the file system stored on the cloud is up to date. It is common for the file system on the cloud to be significantly older than the local file system, rendering the local file system at risk if it is damaged.

For large file systems, the time needed to copy the local file system to the cloud, or vice versa, can be very long, for example, on the order of days to more than a week. Often the cloud file system and/or the local file system will be unavailable during this time. This is very problematic for clients, especially when files are needed sooner e.g., for remote presentations, collaboration with others, etc. File system downtime can also repeat if future copies of the file system(s) need to be made.

The existing technology providing a system and method for synchronizing local and remote (cloud) file systems using a policy-based allocation of synchronization resources. In particular, events that need to be applied to synchronize the local and remote file systems are assigned to different event service classes which have different synchronization priorities. Quotas of synchronization bandwidth can be assigned to the different service classes to ensure that high-priority data is synchronized first without having to wait for low-priority events (e.g., transfer of large, older files, etc.) to complete.

Accordingly, there remains a need for synchronizing and reconciling data streams in real-time.

SUMMARY

In view of the foregoing, an embodiment herein provides a processor-implemented method for synchronizing and reconciling data stream in real-time between an edge node and a cloud node. The method includes (i) classifying data that is obtained from one or more edge nodes in real-time to generate a data stream to synchronize in a location at one or more cloud nodes, (ii) queuing the data stream from the one or more edge nodes and tagging the data with (a) a time stamp of the data, (b) a location of a first edge node, (c) an edge identifier of the first edge node, and (d) an internet protocol address of the first edge node, (iii) automatically determining a frequency count of the data that is queued based on a quantity of the data, wherein the frequency count is automatically determined based on (i) an amount of the data, (ii) the first location of the first edge node, and (iii) a type of an application running in the first edge node, (iv) detecting a database and a type of database in the cloud node based on the frequency count that is determined, (v) receiving, from the first edge node, a request signal for synchronizing the data, a response signal from the cloud node based on the request signal, the data is stored in the cloud node, the response signal includes a second location of the database in the cloud node, (vii) synchronizing the data that is stored in the database in the cloud node to the plurality of edge nodes by updating a synchronization table with the second location of the database in the cloud node, the synchronization table that is stored in the first edge node comprises metadata of the first edge node, and (viii) maintaining the data that is synchronized from the plurality of edge nodes to the cloud node by replicating the data in the plurality of databases of the cloud node, thereby the data is synchronized without duplication.

In some embodiments, the data stream includes at least one of numerical data, string-based data, or image data.

In some embodiments, the frequency count is automatically determined based on (i) an amount of data, (ii) a location of the one or more edge nodes, and (iii) a type of application running in the one or more edge nodes.

In some embodiments, when the synchronization table is not synchronized then the data from the one or more edge nodes are synchronized in a next cycle. A cycle is a time period computed to synchronize the data and is pre-determined by the user.

In some embodiments, each edge node is synchronized with the synchronization table to synchronize the data obtained from the real-time execution at the one or more edge nodes.

In some embodiments, the synchronization table stored in each edge node includes metadata of that edge node. The metadata includes the location of each cloud node, frequency count. The size of the metadata is in a range of 1 Kilobytes (Kb) to 10 Kb.

In some embodiments, the response signal includes a location of the data in the one or more cloud nodes.

In one aspect, an embodiment herein provide a system for synchronizing and reconciling data stream in real-time between an edge node and a cloud node is provided. The system includes (a) a memory that stores a set of instructions, (b) a processor that is configured to execute the set of instructions and is configured to (i) classifying data that is obtained from one or more edge nodes in real-time to generate a data stream to synchronize in a location at one or more cloud nodes, (ii) queue the data stream from the one or more edge nodes and tagging the data with (a) a time stamp of the data, (b) a location of a first edge node, (c) an edge identifier of the first edge node, and (d) an internet protocol address of the first edge node, (iii) automatically determine a frequency count of the data that is queued based on a quantity of the data, wherein the frequency count is automatically determined based on (i) an amount of the data, (ii) the first location of the first edge node, and (iii) a type of an application running in the first edge node, (iv) detecting a database and a type of database in the cloud node based on the frequency count that is determined, (v) receive, from the first edge node, a request signal for synchronizing the data, (vi) upon receiving, a response signal from the cloud node based on the request signal, the data is stored in the cloud node, the response signal includes a second location of the database in the cloud node, (vii) synchronize the data that is stored in the database in the cloud node to the plurality of edge nodes by updating a synchronization table with the second location of the database in the cloud node, the synchronization table that is stored in the first edge node comprises metadata of the first edge node, and (viii) maintain the data that is synchronized from the plurality of edge nodes to the cloud node by replicating the data in the plurality of databases of the cloud node, thereby the data is synchronized without duplication.

In some embodiments, the data stream includes at least one of numerical data, string-based data or image data.

In some embodiments, the frequency count is automatically determined based on (i) an amount of data, (ii) a location of the one or more edge nodes and (iii) a type of application running in the one or more edge nodes.

In some embodiments, when the synchronization table is not synchronized then the data from the one or more edge nodes are synchronized in a next cycle. A cycle is a time period computed to synchronize the data and is pre-determined by the user.

In some embodiments, each edge node is synchronized with the synchronization table to synchronize the data obtained from the real time execution at the one or more edge nodes.

In some embodiments, the synchronization table stored in each edge node includes metadata of that edge node. The metadata includes the location of each cloud node, frequency count. The size of the metadata is in a range of 1 Kilobytes (Kb) to 10 Kb.

In some embodiments, the response signal includes a location of the data in the one or more cloud nodes.

In one aspect, one or more non-transitory computer-readable storage mediums storing one or more sequences of instructions, which when executed by one or more processors, causes a method for synchronizing and reconciling data stream in a real time between an edge node and a cloud node performing steps of (i) classifying data that is obtained from one or more edge nodes in real-time to generate a data stream to synchronize in a location at one or more cloud nodes, (ii) queuing the data stream from the one or more edge nodes and tagging the data with (a) a time stamp of the data, (b) a location of a first edge node, (c) an edge identifier of the first edge node, and (d) an internet protocol address of the first edge node, (iii) automatically determining a frequency count of the data that is queued based on a quantity of the data, wherein the frequency count is automatically determined based on (i) an amount of the data, (ii) the first location of the first edge node, and (iii) a type of an application running in the first edge node, (iv) detecting a database and a type of database in the cloud node based on the frequency count that is determined, (v) receiving, from the first edge node, a request signal for synchronizing the data, a response signal from the cloud node based on the request signal, the data is stored in the cloud node, the response signal includes a second location of the database in the cloud node, (vii) synchronizing the data that is stored in the database in the cloud node to the plurality of edge nodes by updating a synchronization table with the second location of the database in the cloud node, the synchronization table that is stored in the first edge node comprises metadata of the first edge node, and (viii) maintaining the data that is synchronized from the plurality of edge nodes to the cloud node by replicating the data in the plurality of databases of the cloud node, thereby the data is synchronized without duplication.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
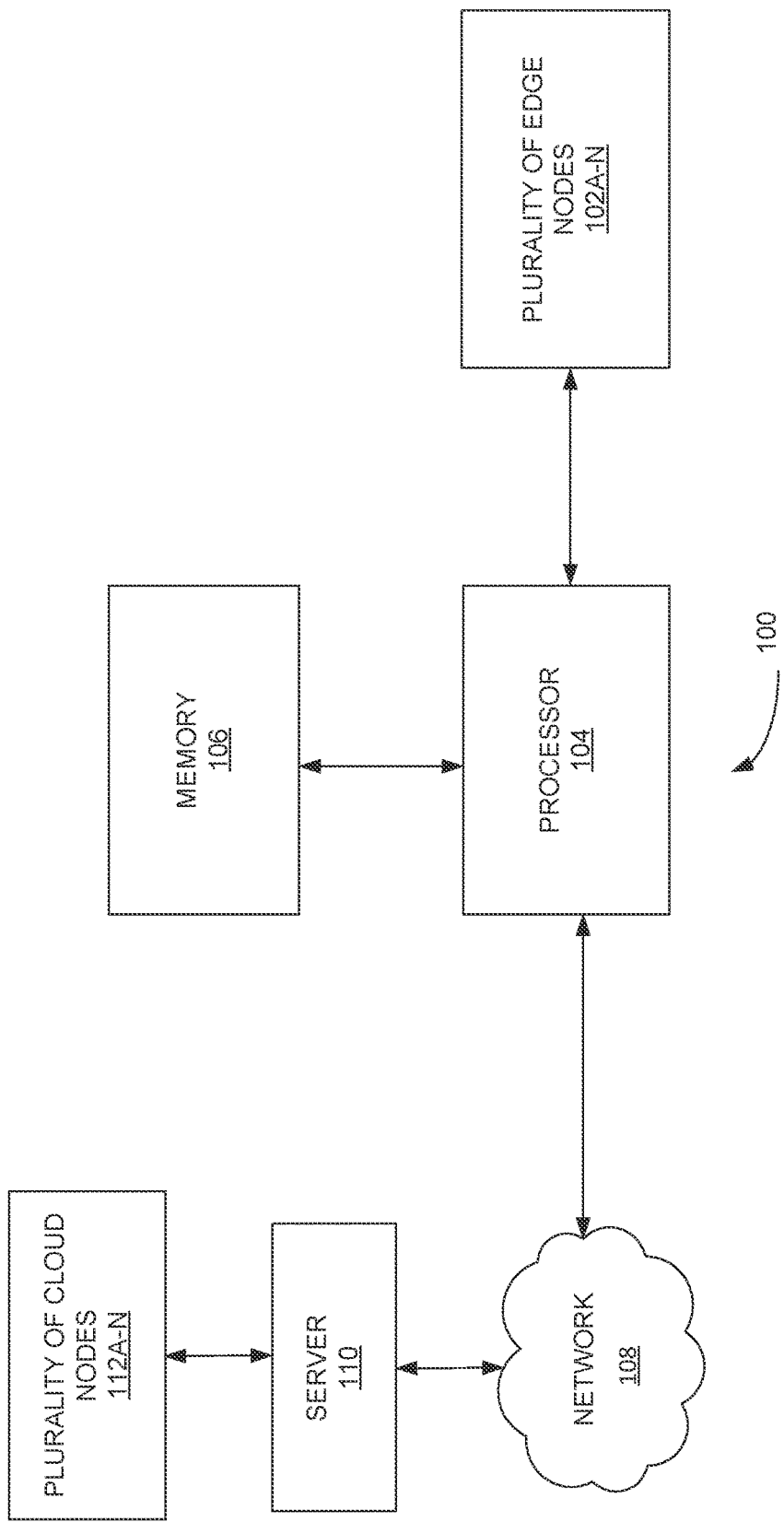
FIG. 1 is a block diagram that illustrates a system for synchronizing and reconciling data stream from an edge node to a cloud node in real-time according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a system and a method for a system for synchronizing and reconciling data stream in real-time between an edge node and a cloud node. Referring now to the drawings, and more particularly to FIGS. 1 through 5, where similar reference characters denote corresponding features consistently throughout the figures, preferred embodiments are shown.

FIG. 1 is a block diagram that illustrates a system 100 for synchronizing and reconciling data stream from an edge node 102 to a cloud node 112 in real-time according to an embodiment herein. The system 100 synchronizes the data stream from a plurality of edge nodes 102A-N (distributed system) to a central location in the cloud node 112. The cloud node may be a cloud server. In some embodiments, the system 100 maintains a state of the cloud server and monitors the data stream from the plurality of edge nodes 102A-N. The system 100 detects an exact location of the data stream coming from the plurality of edge nodes 102A-N. The data stream includes a plurality of data obtained from a plurality of edge nodes 102A-N. The system 100 pushes the plurality of data received from different locations back to the determined central location in the cloud node 112 in a synchronized manner. A database access
and synchronization layer identifies the plurality of data in the central location in the cloud node 112 and send it back to the requesting edge node. The system 100 includes a synchronization table in the plurality of edge nodes 102A-N to synchronize a location of data in a central location in the cloud node 112. The system 100 includes a memory 106 and a processor 104. The memory 106 stores a set of instructions. The processor 104 executes the set of instructions to synchronize the plurality of data from a plurality of edge servers in the plurality of edge nodes 102A-N to a central location in the cloud node 112. The processor 104 classifies the plurality of data from the plurality of edge nodes 102A-N to generate a data stream in real-time. The processor 104 classifies the plurality of data from the plurality of edge nodes 102A-N to synchronize the plurality of data in a location at the cloud nodes 112. In some embodiments, the edge node 102A acts as an end-user portal for communication with other nodes in cluster computing. In some embodiments, the edge nodes are at least one of the gateway nodes or edge communication nodes. In some embodiments, the edge node 102A includes at least one of but is not limited to computer, mobile phone, tab. The processor 104 queues the classified data associated with the plurality of edge nodes 102A-N. The processor 104 obtains the exact location of the cloud node 112 or central server and tags the classified data with (i) a time stamp, (ii) a location, (iii) an edge identifier, and (iv) an internet protocol address. In some embodiments, the classified data is tagged to identify the location of the classified data in the cloud node 112.

In some embodiments, the processor 104 queues the data from different locations of the plurality of edge nodes 102A-N. The information of the central location is located as metadata with every application. The metadata includes information that comprises application information, a central repository, and gets updated with respect to the frequency required for synchronizing to maintain records. The processor 104 synchronizes the data based on the frequency. The database in a local location may be bulky when the plurality of data is stored in the local location. In some embodiments, the local location is a plurality of edge server locations. The operation may be compute-heavy if the system continuously synchronizes the data to the database in the central location. The processor 104 creates a frequency count to automatically synchronize the plurality of data from the plurality of edge nodes 102A-N to the cloud node 112 regularly. The processor 104 determines a frequency based on the quantity of data from the plurality of cloud nodes 102A-N. In some embodiments, detection of the database is saved as metadata. The frequency of updating the information may be auto-decided by the processor 104.

The processor 104 detects a first pre-defined location in the central location in the cloud node 112 and a type of database in the plurality of cloud nodes to synchronize the data that is obtained from the plurality of edge nodes 102A-N. In some embodiments, once the database in the cloud node 112 is detected, the Input/Output reads on the file system are monitored and the data input is sent to the central location server in the cloud node 112 and the data is synchronized. The processor 104 receives a request signal from the plurality of edge nodes 102A-N for synchronizing the classified data from the plurality of cloud nodes to the plurality of edge nodes when any location fails to transfer the classified data. The processor 104 maintains the data received from the plurality of edge nodes 102A-N in a plurality of database locations in the cloud node 112 by replicating the classified data in the plurality of cloud nodes 112A-N. In some embodiments, the data is replicated to ensure fault tolerance. In some embodiments, volume-based replication of the database makes it easy to clone the same data in the plurality of edge nodes 102A-N in the plurality of locations.

The same data is maintained in the plurality of edge nodes 102A-N in the plurality of locations. In some embodiments, in case one database in the cloud node 112 is shut/down or fails during any transaction, the other database in the cloud node 112 may store data.

The processor 104 receives a response signal from the plurality of cloud nodes 112A-N in the central location when the data is stored in the cloud node 112 in the central location. The processor updates the location of the classified data in the cloud node 112 to the synchronization table in the plurality of edge nodes 102A-N.

The response signal is sent back to the calling edge node location to update the synchronization table in the edge node once the data is synchronized in the cloud node 112. In some embodiments, the plurality of synchronization tables is present in the plurality of edge nodes 102A-N individually. The synchronization table is updated to denote that the synchronization is completed once the data is synchronized in the central location in the cloud node 112. If the synchronization table is not updated then the data gets synchronized in the next cycle. The replication layer determines the next cycle if the synchronization table is not updated.

The individual synchronization tables are present on the plurality of edge node locations. In some embodiments, the detection and synchronization are done in at least one of real-time or scheduled.

The processor 104 synchronizes the data from the plurality of the second locations in the cloud node 112 to the plurality of edge nodes 102A-N without duplicating the data based on the synchronization table that is updated. The processor 104 synchronizes the data from the plurality of databases in the cloud node 112 to the plurality of edge nodes 102A-N when the request signal is received from the plurality of edge nodes 102A-N.

The plurality of data synchronization may be done from the plurality of edge nodes 102A-N to the cloud node without additional code from an end-user perspective. A legacy application can be deployed on edge without any extra effort.

Figure 2:
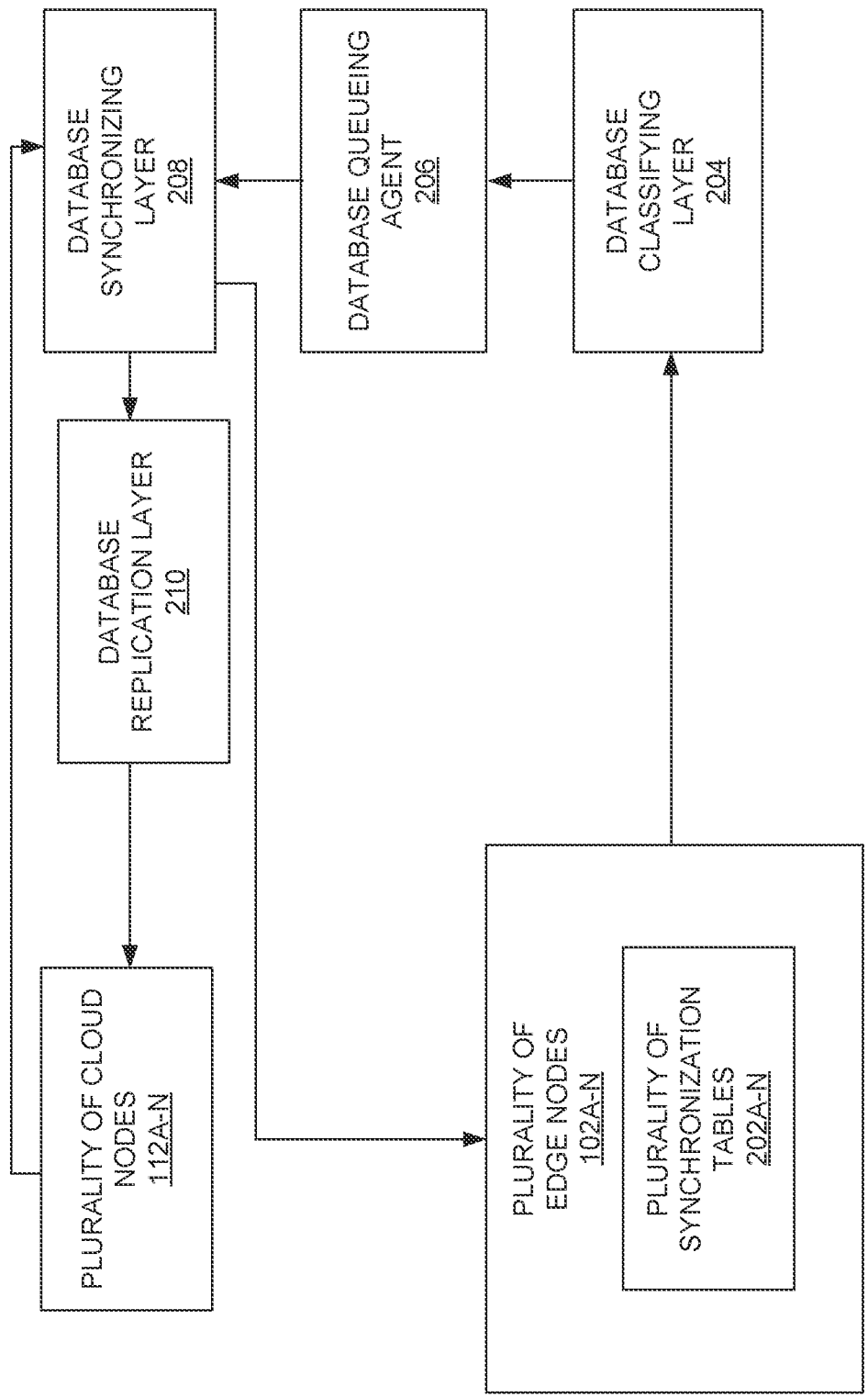
FIG. 2 is a block diagram that illustrates a process of synchronizing and reconciling data stream from the edge node to the cloud node in real-time of FIG. 1 according to some embodiments herein.

FIG. 2 is a block diagram that illustrates a process of synchronizing and reconciling data stream from the edge node to the cloud node in real-time of FIG. 1 according to some embodiments herein. The plurality of data from the plurality of edge nodes 102A-N is synchronized with the cloud node 112 using a network 108. In some embodiments, the plurality of edge nodes 102A-N includes at least one of but is not limited to computer, mobile phone, tablet.

In some embodiments, the plurality of edge nodes 102A-N is a computer that acts as an end-user portal for communication with other nodes in cluster computing. The database classifying layer 204 classifies the data from the plurality of edge nodes 102A-N of the data stream in real-time to synchronize with an exact location at a plurality of databases in the cloud node 112. In some embodiments, the database classifying layer 204 detects the database in the cloud node 112 and data type. The database queuing agent 206 queues the classified data associated with the plurality of edge nodes 102A-N and tags the classified data with (i) a time stamp, (ii) a location, (iii) an edge identifier, and (iv) an internet protocol address. The database synchronization layer 208 synchronizes the classified data from the plurality of edge nodes 102A-N to the cloud node 112 based on the frequency count. The database synchronization layer 208 synchronizes the plurality of data to a pre-defined location and a type of database in the cloud node 112. In some embodiments, the frequency count is automatically determined based on (i) an amount of data, (ii) a location of the plurality of edge nodes, and (iii) a type of application running in the plurality of edge nodes 102A-N. The database replication layer 210 replicates the data and ensures fault tolerance. In some embodiments, volume-based replication of the database makes it easy to clone the same data in the plurality of edge nodes 102A-N. In some embodiments, the node in cloud computing is a connection point, either a redistribution point or an endpoint for data transmissions in general. The cloud node 112 stores the plurality of data from the plurality of edge nodes 102A-N. The cloud node is connected with the database synchronization layer 208 to synchronize the location of the data in the plurality of databases in the cloud node 112 to the plurality of synchronization tables 202A-N in the plurality of edge nodes 102A-N. The plurality of synchronization tables 202A-N in the plurality of edge nodes 102A-N include the exact location of the plurality of data in the cloud node 112. The processor 104 synchronizes the data from the plurality of databases in the cloud node 112 to the plurality of edge nodes 102A-N without duplicating the data based on the synchronization table that is updated. In some embodiments, the response signal from the cloud node 112 comprises a location of the data in the plurality of databases in the cloud node 112.

In some embodiments, when the synchronization table is not synchronized then the data from the plurality of edge nodes 102A-N is synchronized in the next cycle. A cycle is a time period computed to synchronize the data and may be pre-determined by the user. In some embodiments, the synchronization table stored in each edge node comprises metadata of the edge node. In some embodiments, the metadata comprises the location of each cloud node, frequency count. The size of the metadata is in a range of 1 kilobyte (Kb) to 10 Kb.

Figure 3:
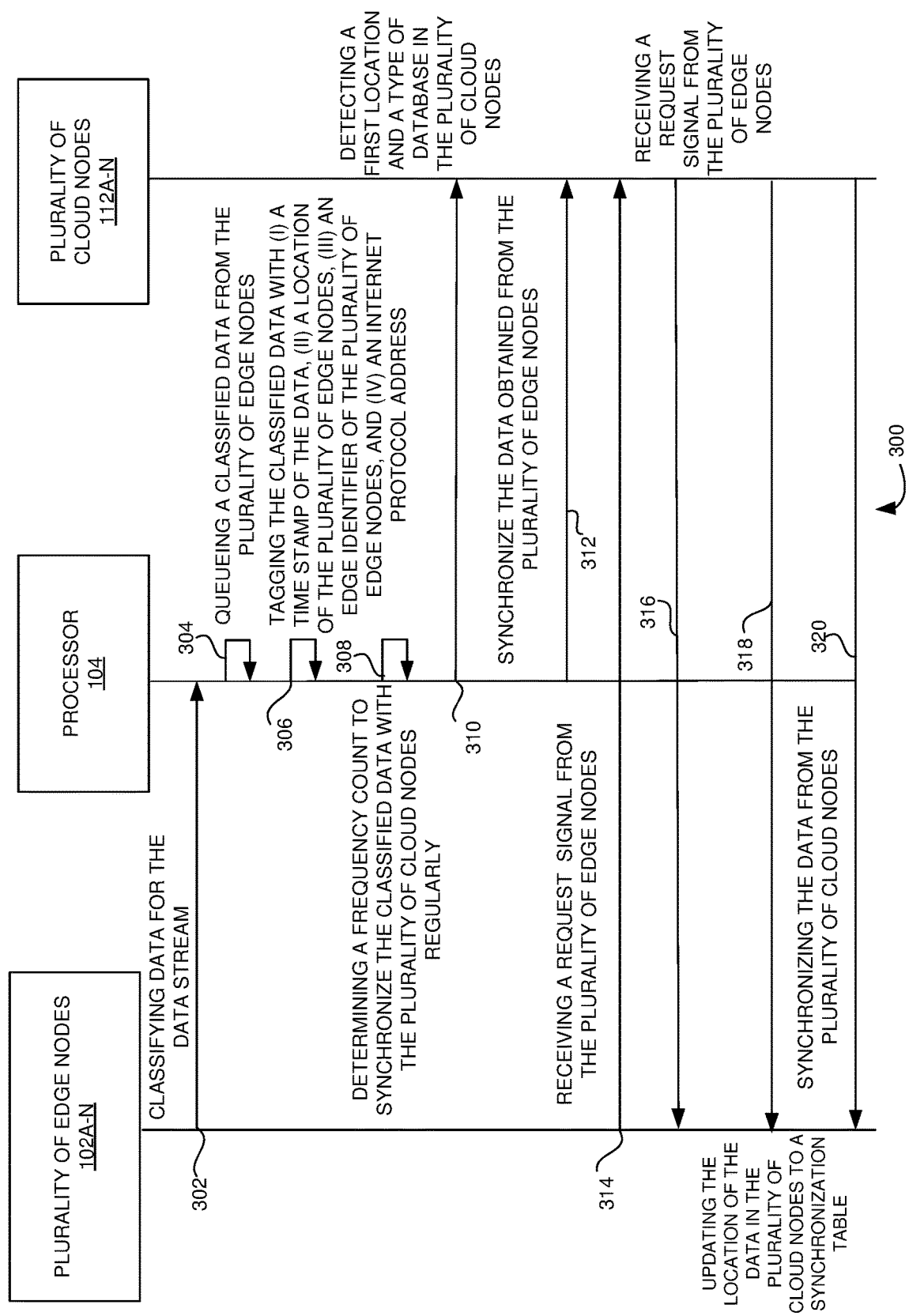
FIG. 3 is an interaction diagram that illustrates a method for synchronizing and reconciling data stream from an edge node to a cloud node in real-time according to an embodiment herein.

FIG. 3 is an interaction diagram that illustrates a method for synchronizing and reconciling data stream from an edge node to a cloud node in a real-time according to an embodiment herein. At step 302, providing a plurality of data to the processor from the plurality of edge nodes 102A-N. The method 300 includes classifying data for the data stream that is obtained from a plurality of edge nodes 102A-N using the processor 104. At step 304, queuing a classified data associated with the plurality of edge nodes 102A-N using the processor 104. At step 306, tagging the classified data with (i) a time stamp, (ii) a location, (iii) an edge identifier, and (iv) an internet protocol address using the processor 104. At step 308, determining a frequency count to synchronize the classified data associated with a real-time execution at the plurality of edge nodes 102A-N with the plurality of cloud nodes 112A-N using the processor 104. At step 310, synchronizing the classified data associated with the plurality of edge nodes 102A-N in the plurality of cloud nodes 112A-N by detecting a pre-defined location using the processor 104 and a type of database in the plurality of cloud nodes 112A-N. At step 312, synchronizing the data obtained from the plurality of edge nodes 102A-N using the processor 104. At step 314, receiving a request signal from the plurality of edge nodes 102A-N by the processor 104 when the any location in the plurality of cloud nodes 112A-N fails to transfer the data. At step 316, receiving a response signal from the plurality of cloud nodes 112A-N using the processor 104. At step 318, updating the location of the data in the plurality of cloud nodes 112A-N to a synchronization table in the edge node by the processor 104. At step 320, synchronizing the data from the plurality of cloud nodes 112A-N to the plurality of edge nodes 102A-N without duplicating the data based on the synchronization table by the processor 104.

Figure 4A:
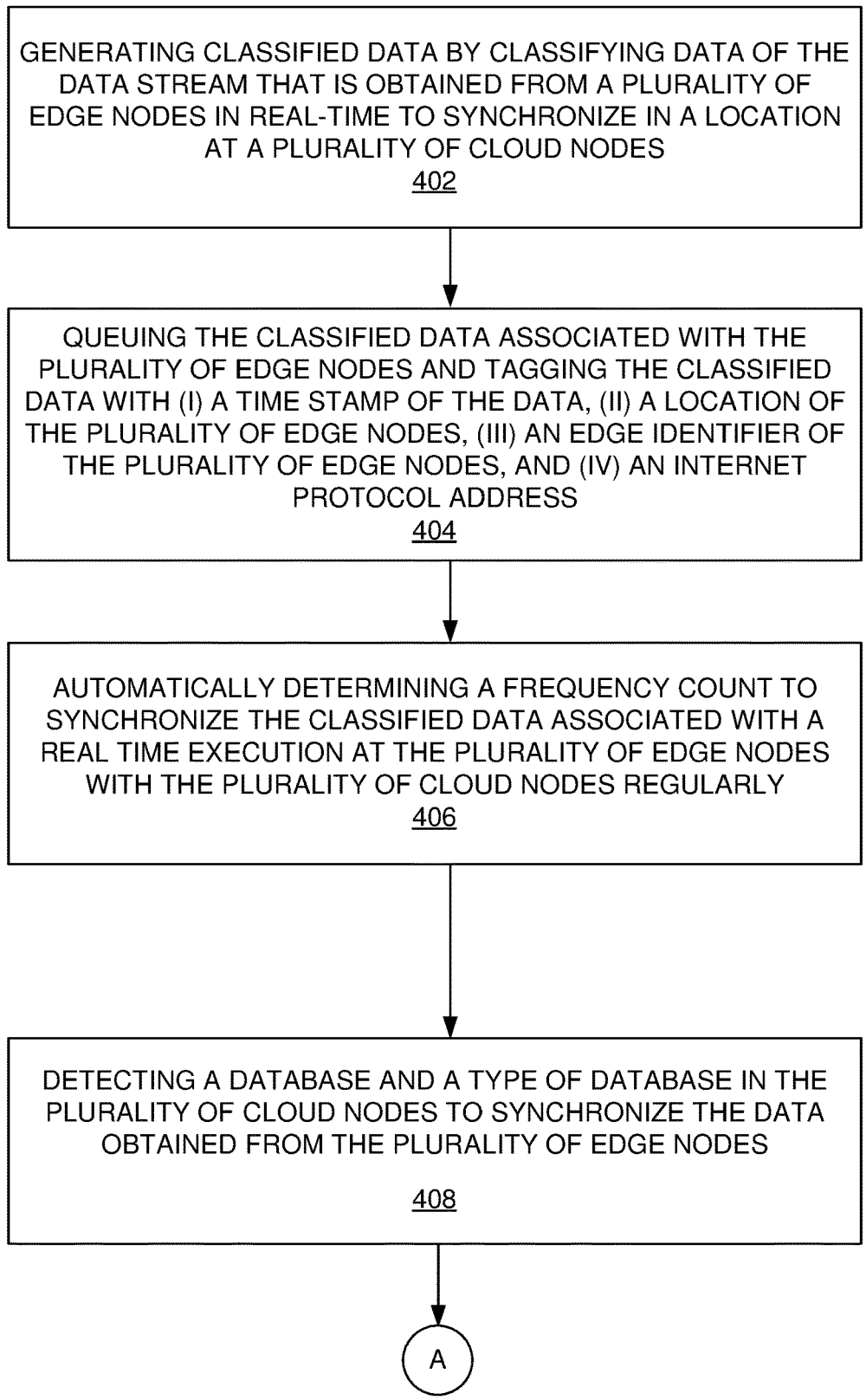
FIGS. 4A-4B are flow diagrams that illustrate a method for synchronizing and reconciling data stream from the edge node to the cloud node in real-time according to an embodiment herein.
Figure 4B:
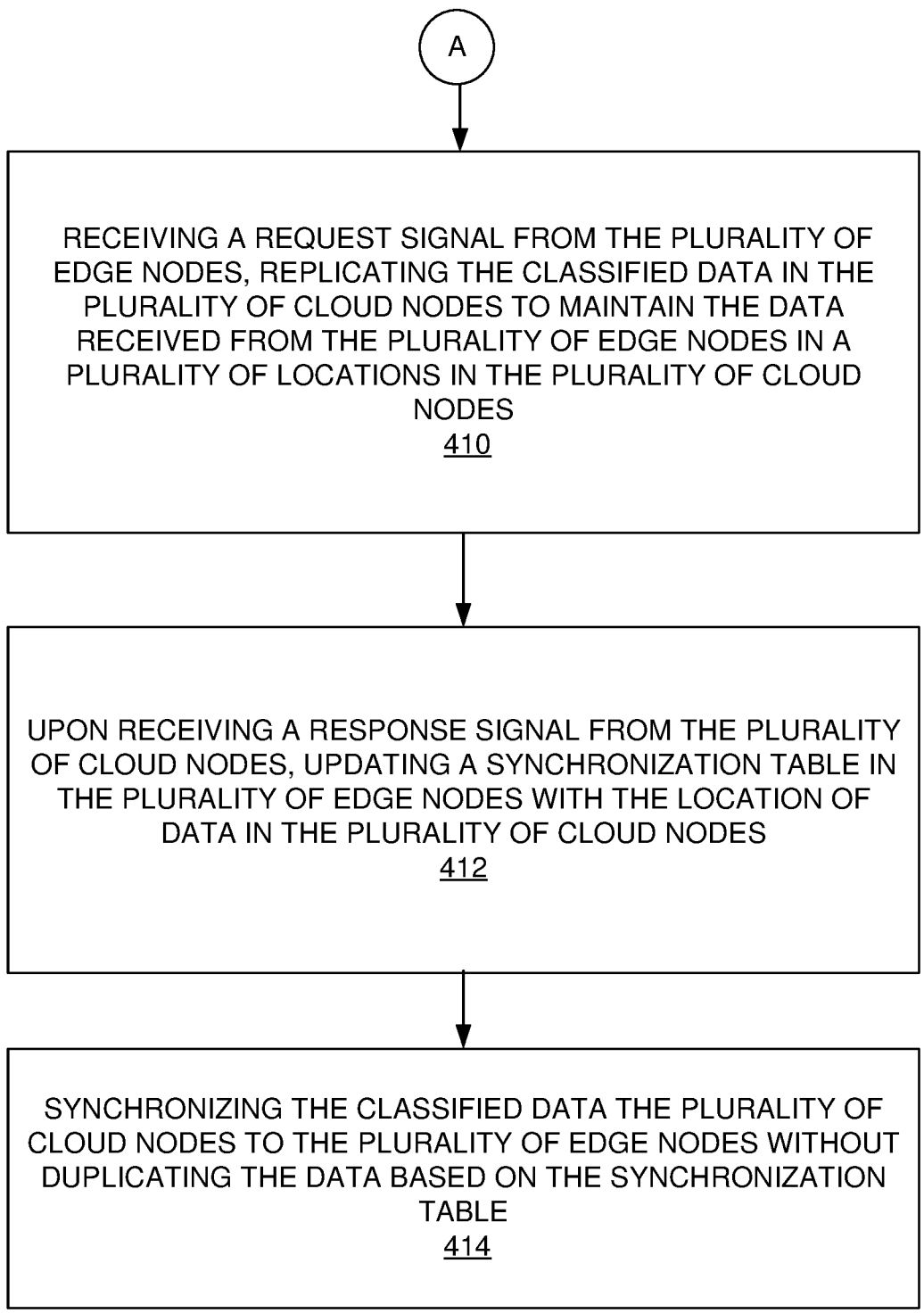

FIGS. 4A-4B are flow diagrams that illustrate a method for synchronizing and reconciling data stream from the edge node to the cloud node in real-time according to an embodiment herein. At step 402, data of the data stream that is obtained from a plurality of edge nodes is classified in real-time to synchronize in a location at a plurality of cloud nodes. At step 404, the classified data associated with the plurality of edge nodes are queued and the classified data is tagged with (i) a time stamp, (ii) a location, (iii) an edge identifier, and (iv) an internet protocol address. At step 406, a frequency count is automatically determined to synchronize the classified data associated with a real-time execution at the plurality of edge nodes with the plurality of cloud nodes regularly. At step 408, a pre-defined location and a type of database in the plurality of cloud nodes and the classified data is stored in the first location in the plurality of cloud nodes. At step 410, a request signal from the plurality of edge nodes is received and the classified data in the plurality of cloud nodes is replicated from the plurality of edge nodes in a plurality of locations in the plurality of cloud nodes. At step 412, a response signal from the plurality of cloud nodes is received and the location of the data in the plurality of cloud nodes is updated to a synchronization table in the plurality of edge nodes. At step 414, the data from the plurality of cloud nodes are synchronized to the plurality of edge nodes without duplicating the data based on the synchronization table.

Figure 5:
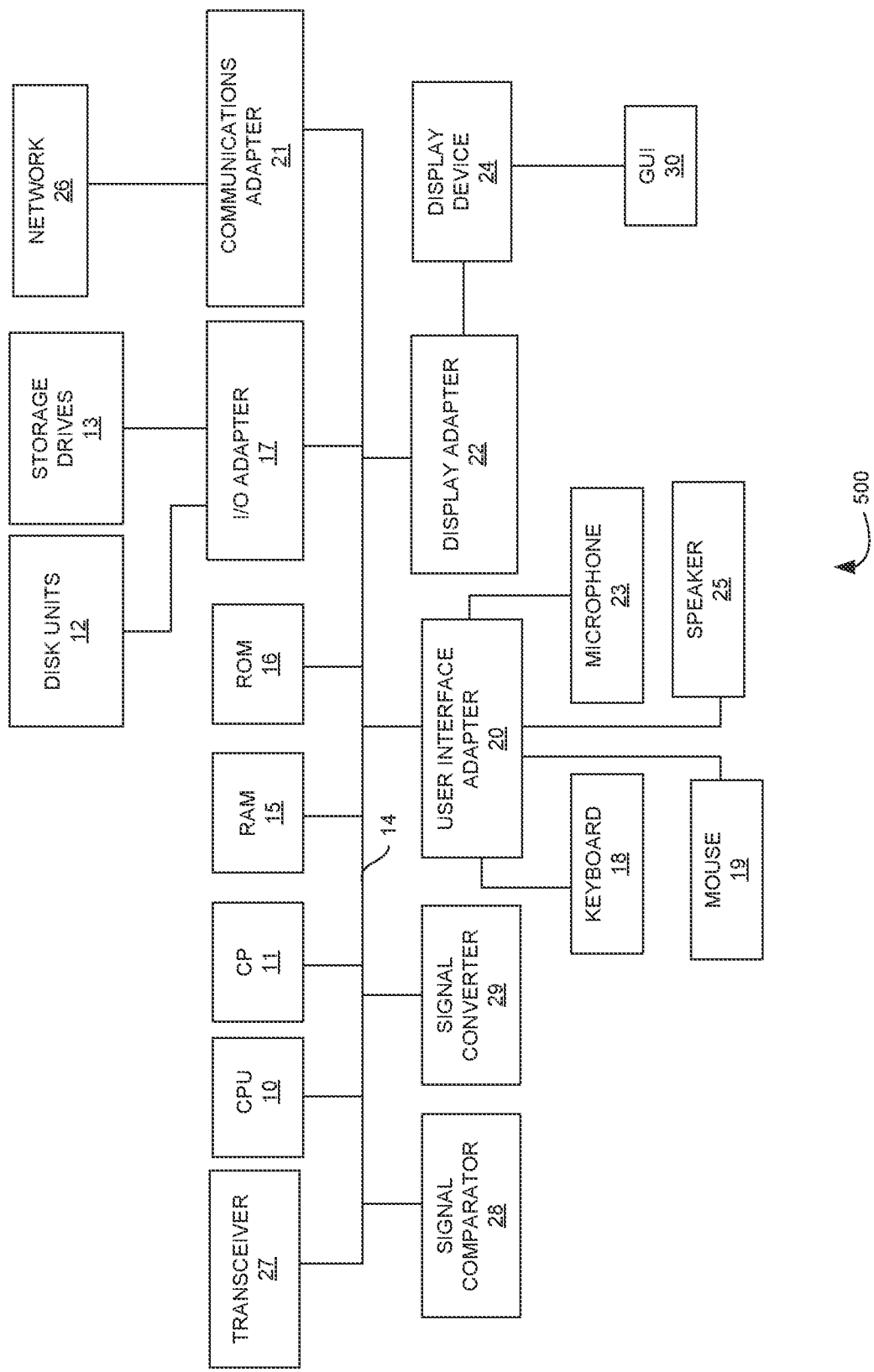
FIG. 5 is a block diagram of a schematic diagram of a device used in accordance with embodiments herein.

A representative hardware environment for practicing the embodiments herein is depicted in FIG. 5, with reference to FIGS. 1 through 4A and 4B. This schematic drawing illustrates a hardware configuration of a server/computer system/user device in the plurality of edge node 102A-N in accordance with the embodiments herein. The user device includes at least one processing device 10 and a cryptographic processor 11. The special-purpose CPU and the cryptographic processor (CP) 11 may be interconnected via system bus 14 to various devices such as a random-access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for synchronizing and reconciling data stream in real-time between an edge node and a cloud node, comprising:
    classifying data that is obtained from a plurality of edge nodes in real-time to generate a data stream, wherein the data stream comprises at least one of numerical data, string-based data, or image data;
    queuing the data stream from the plurality of edge nodes and tagging the data with (i) a time stamp of the data, (ii) a first location of a first edge node, (iii) an edge identifier of the first edge node, and (iv) an internet protocol address of the first edge node;
    automatically determining a frequency count of the data that is queued based on a quantity of the data, wherein the frequency count is automatically determined based on (i) an amount of the data, (ii) the first location of the first edge node, and (iii) a type of an application running in the first edge node;
    detecting a database and a type of database in the cloud node based on the frequency count that is determined, wherein information of the database is located as metadata with the application running in the first edge node;
    receiving a request signal for synchronizing the data from the first edge node to the cloud node;
    upon receiving, a response signal from the cloud node based on the request signal, the data is stored in the cloud node, wherein the response signal includes a second location of the database in the cloud node;
    synchronizing the data that is stored in the database in the cloud node to the plurality of edge nodes by updating a synchronization table with the second location of the database in the cloud node, wherein the synchronization table that is stored in the first edge node comprises metadata of the first edge node; and
    maintaining the data that is synchronized from the plurality of edge nodes to the cloud node by replicating the data in the plurality of databases of the cloud node, thereby the data is synchronized without duplication.

2. The processor-implemented method of claim 1, further comprising updating the synchronization table in a first cycle, and synchronizing the data from the plurality of edge nodes in the first cycle, wherein a cycle is a time period computed to synchronize the data and is pre-determined by a user.

3. The processor-implemented method of claim 1, wherein the metadata of the first edge node comprises the second location of the database in the cloud node, the frequency count, wherein a size of the metadata of the first edge node is in a range of 1 Kilobytes (Kb) to 10 Kb.

4. A system for synchronizing and reconciling data stream in real-time between an edge node and a cloud node, the system comprises:
    a memory that stores a set of instructions;
    a processor that is configured to execute the set of instructions and is configured to
        classify data that is obtained from a plurality of edge nodes in real-time to generate a data stream wherein the data stream comprises at least one of numerical data, string-based data, or image data;
        queue the data stream from the plurality of edge nodes and tagging the data with (i) a time stamp of the data, (ii) a first location of a first edge node, (iii) an edge identifier of the first edge node, and (iv) an internet protocol address of the first edge node;
        automatically determine a frequency count of the data that is queued based on a quantity of the data, wherein the frequency count is automatically determined based on (i) an amount of the data, (ii) the first location of the first edge node, and (iii) a type of application running in the first edge node;
        detect a database and a type of database in the cloud node based on the frequency count that is determined, wherein information of the database is located as metadata with an application;
        receive a request signal for synchronizing the data from the first edge node to the cloud node;
        upon receiving, a response signal from the cloud node based on the request signal, the data is stored in the cloud node, wherein the response signal includes a second location of the database in the cloud node;
        synchronize the data that is stored in the database in the cloud node to the plurality of edge nodes by updating a synchronization table with the second location of the database in the cloud node, wherein the synchronization table that is stored in the first edge node comprises metadata of the first edge node; and
        maintain the data that is synchronized from the plurality of edge nodes to the cloud node by replicating the data in the plurality of databases of the cloud node, thereby the data is synchronized without duplication.

5. The system of claim 4, wherein the processor is configured to update the synchronization table in a first cycle and synchronize the data from the plurality of edge nodes in the first cycle, wherein a cycle is a time period computed to synchronize the data and is pre-determined by a user.

6. The system of claim 4, wherein the metadata of the first edge node comprises the second location of the database in the cloud node, the frequency count, wherein a size of the metadata of the first edge node is in a range of 1 Kilobytes (Kb) to 10 Kb.

7. One or more non-transitory computer-readable storage mediums storing one or more sequences of instructions, which when executed by one or more processors, causes a method for synchronizing and reconciling data stream in real-time between an edge node and a cloud node performing steps of:
    classifying data that is obtained from a plurality of edge nodes in real-time to generate a data stream wherein the data stream comprises at least one of numerical data, string-based data, or image data;

queuing the data stream from the plurality of edge nodes and tagging the data with (i) a time stamp of the data, (ii) a first location of a first edge node, (iii) an edge identifier of the first edge node, and (iv) an internet protocol address of the first edge node;

automatically determining a frequency count of the data that is queued based on a quantity of the data, wherein the frequency count is automatically determined based on (i) an amount of the data, (ii) the first location of the first edge node, and (iii) a type of application running in the first edge node;

detecting a database and a type of database in the cloud node based on the frequency count that is determined, wherein information of the database is located as metadata with an application;

receiving a request signal for synchronizing the data from the first edge node to the cloud node;

upon receiving, a response signal from the cloud node based on the request signal, the data is stored in the cloud node, wherein the response signal includes a second location of the database in the cloud node;

synchronizing the data that is stored in the database in the cloud node to the plurality of edge nodes by updating a synchronization table with the second location of the database in the cloud node, wherein the synchronization table that is stored in the first edge node comprises metadata of the first edge node; and maintaining the data that is synchronized from the plurality of edge nodes to the cloud node by replicating the data in the plurality of databases of the cloud node, thereby the data is synchronized without duplication.

\* \* \* \* \*